United States Patent [19]

Lo et al.

[11] Patent Number: 4,879,051

[45] Date of Patent: Nov. 7, 1989

[54] METHOD OF BOOSTING FOAM IN LOW SUDSING DETERGENTS WITH ZWITTERIONIC POLYSILOXANE

[75] Inventors: Sunny J. Lo, Sussex, England; Steven A. Snow, Midland, Mich.

[73] Assignee: Dow Corning Corporation, Midland, Mich.

[21] Appl. No.: 229,690

[22] Filed: Aug. 8, 1988

[51] Int. Cl.[4] ...................... C11D 17/00; B01F 17/00; C08G 77/38; C07F 7/10

[52] U.S. Cl. ...................................... 252/8.75; 8/137; 252/8.8; 252/174.15; 252/355; 556/425

[58] Field of Search .................. 252/541, 174.15, 8.75, 252/8.8; 8/137

[56] References Cited

FOREIGN PATENT DOCUMENTS 276114 7/1988 European Pat. Off. .

*Primary Examiner*—A. Lionel Clingman
*Attorney, Agent, or Firm*—Jim DeCesare

[57] ABSTRACT

A method of boosting foam in a low sudsing detergent system containing high levels of cationic or nonionic fabric softening surfactants in a textile wash liquor wherein there is added to the wash liquor in addition to the detergent a foam boosting effective amount of a short chain non-toxic organosulfobetaine zwitterionic siloxane based silicone surfactant compound, and causing the detergent and the silicone compound to be homogeneously intermixed in the wash liquor along with the textiles.

12 Claims, No Drawings

METHOD OF BOOSTING FOAM IN LOW SUDSING DETERGENTS WITH ZWITTERIONIC POLYSILOXANE

BACKGROUND OF THE INVENTION

This invention relates to a new class of zwitterionic surfactant and more particularly to zwitterionic silicone surfactant compounds and their use as foam boosters for low sudsing household detergents.

Foaming power has become associated in consumer minds with high detersive power, however, foam has little direct influence in washing clothes, has no direct relationship to detergency in fabric washing, and does not improve cleaning in a laundry or home washing machine. In fact, in machine laundering operations, too much foam is undesirable because of interference with the mechanical action necessary for effective cleaning. In any event, compounds known as profoamers, foam boosters, and foam regulators, have been included in certain detergent products where high foam volume is functionally or aesthetically desirable. Typical foam boosters are amine oxides and alkanolamides, for example. In alkaline detergent solutions, semipolar amine oxide type nonionic surfactants generate copious suds, but high water solubility and a hygroscopic nature limit the use of amine oxides to liquid detergents. The use of fatty amine oxides in detergents is taught, for example, in U.S. Pat. No. 2,999,068, issued Sept. 5, 1961; U.S. Pat. No. 3,001,945, issued Sept. 26, 1961; U.S. Pat. No. 3,085,982, issued Apr. 16, 1963; U.S. Pat. No. 3,387,430: and U.S. Pat. No. 3,943,234, issued Mar. 9, 1976. In such detergent systems, it is not uncommon to include high levels of cationic and nonionic surfactant materials in order to improve the detergency and fabric softening properties of the system. However, these materials, especially the fabric softeners, often inhibit the potent foaming action of organic sulfonate surfactants present in the detergent such as linear alkylbenzene sulfonate, and hence neutralize their effectiveness. The result is a low sudsing detergent, and in such low sudsing detergents there is a need for an effective foam booster to be used in place of or in addition to the foam boosters present therein. Consumers have, in an effort to compensate for the low sudsing characteristics of such products, doubled and even tripled the dosage levels of detergent required in an effort to produce aesthetic foam, but the large dosages are ineffective and do not produce foam to any extent to the consternation of the consumer. Amine oxides have been employed in such highly formulated systems but such amine oxides tend to form toxic nitrosamines due to thermal decomposition. This disadvantage, along with the high water solubility and hygroscopicity of amine oxides, has created a need for an alternative profoamer. In U.S. Pat. No. 3,280,179, issued Oct. 18, 1966, there is disclosed zwitterionic organosulfobetaine surfactant compositions which are used to increase the foam height and improve the frothing action of organic anionic surfactants such as aqueous solutions of sodium lauryl sulfate. However, the foam boosters in U.S. Pat. No. 3,280,179, are not silicones as are the profoamers of the present invention nor are they comparable to the particular new class of zwitterionic siloxane based surfactant compositions of the present invention. For example, it is notoriously well known that silicones reduce foam rather than boost foam, and therefore there is disclosed herein a radically different and new catergory of silicone materials which function in a fashion which is traditionally and totally unexpected for such silicone materials. The silicones of the present invention also lower the surface tension of fluids ten to fifteen dynes per centimeter below that of the organic type surfactant as in U.S. Pat. No. 3,280,179, a factor which improves the overall foam boosting capacity and capabilities of the silicone type surfactant over that of the organic surfactant type. This additional advantage in a better lowering of the surface tension is also believed to result in improved cleaning or detergency in comparison to the cleaning or detergency that is obtained with organic type surfactants as represented, for example, by the foregoing prior art patent. Hence, the advantages of the present invention over that of the prior art, and the disadvantages of the prior art should be apparent, and the compounds of the present invention provide a viable and effective non-toxic alternative to the amine oxide compositions of the prior art.

SUMMARY OF THE INVENTION

This invention relates to a method of boosting foam in a low sudsing detergent system containing high levels of cationic or nonionic fabric softening surfactants in a textile wash liquor comprising adding to the wash liquor in addition to the detergent a foam boosting effective amount of a short chain non-toxic organosulfobetaine zwitterionic siloxane based surfactant compound, and causing the detergent and the silicone compound to be homogeneously intermixed in the wash liquor along with the textiles.

The invention also relates to a detergent comprising a low sudsing detergent formulation including high levels of cationic or nonionic fabric softening surfactants for a textile wash liquor and a foam boosting effective amount of a short chain non-toxic organosulfobetaine zwitterionic siloxane based surfactant compound, the detergent and the silicone compound being homogeneously intermixed together for use in the wash liquor along with the textiles, the silicone compound having the following structural formula:

$$Me_3SiO(SiMe_2O)_x(SiMeR^1O)_ySiMe_3$$

wherein:

Me = methyl;

$R^1$ = $-CH_2CH_2CH_2N^+(R^2)_2(CH_2)_zSO_3^-$, or $-CH_2CH_2CH_2N(R^2)_2(CH_2)_zCOO^-$;

$R^2$ = an alkyl group having from one to six carbon atoms or $(CH_2)_mOH$;

m = 1–6;

x = 0–10;

y = 1–3; and z = 1–4.

The silicone compound can also be characterized as comprising a compound having the general formula selected from the group consisting of:

$$Me_3SiO(SiMeR^1O)_ySiMe_3$$

and $$Me_3SiO(SiMe_2O)_x(SiMeR^1O)_ySiMe_3$$

wherein:

Me = methyl;

$R^1$ = $-CH_2CH_2CH_2N^+(R^2)_2(CH_2)_zSO_3^-$, or $-CH_2CH_2CH_2N^+(R^2)_2(CH_2)_zCOO^-$;

$R^2$=an alkyl group having from one to six carbon atoms or $(CH_2)_mOH$;

m=1–6;

x=1–10;

y=1–3; and z=1–4.

The invention further relates to a method of reducing the surface tension of a low sudsing detergent system containing high levels of cationic or nonionic fabric softening surfactants in a textile wash liquor comprising adding to the wash liquor in addition to the detergent an effective amount of a short chain non-toxic organosulfobetaine zwitterionic siloxane based surfactant compound, and causing the detergent and the silicone compound to be homogeneously intermixed in the wash liquor along with the textiles. The silicone compound is selected from the group of compounds having the following formulas:

$R—N^{+}Me_2(CH_2)_3S^{-}O_3$;

$R—N^{+}Me_2(CH_2)C^{-}OO$; and $R—N^{+}Me[(CH_2)_2OH](CH_2)_3S^{-}O_3$;

where in each case R is $(Me_3SiO)_2Si(Me)—(CH_2)_3—$.

In addition the invention relates to a method of boosting foam and simultaneously reducing the surface tension in a low sudsing detergent system containing high levels of cationic or nonionic fabric softening surfactants in a textile wash liquor comprising adding to the wash liquor in addition to the detergent a foam boosting and surface tension reducing effective amount of a short chain non-toxic organosulfobetaine zwitterionic siloxane based surfactant compound, and causing the detergent and the silicone compound to be homogeneously intermixed in the wash liquor along with the textiles. The silicone compound is preferably present in the wash liquor in an amount of from about one-tenth of one percent to about one percent by weight based on the weight of wash liquor.

It is the object of the present invention to provide a non-toxic foam boosting substitute for the otherwise conventional organic amine oxide profoamers which under thermal decomposition form toxic nitrosamines, the new foam boosting agent being in the form of short chain non-toxic sulfobetaine zwitterionic organofunctional siloxane based surfactant compounds.

These and other objects, features, and advantages, of the present invention will become apparent from a consideration of the following detailed description of the invention.

DETAILED DESCRIPTION OF THE INVENTION

A surfactant is a compound that reduces surface tension when dissolved in a liquid. Surfactants exhibit combinations of cleaning, detergency, foaming, wetting, emulsifying, solubilizing, and dispersing properties. They are classified depending upon the charge of the surface active moiety. In anionic surfactants, the moiety carries a negative charge as in soap. In cationic surfactants, the charge is positive. In non-ionic surfactants, there is no charge on the molecule, and in amphoteric surfactants, solubilization is provided by the presence of positive and negative charges linked together in the molecule. A zwitterion is a special category and is a molecule that exists as a dipolar ion rather than in the un-ionized form. The molecule is neutral overall but has a large charge separation like an amino acid. Zwitterions are also known as hybrid ions, and internal or intramolecular salts. In the case of amino acids, they are electrolytes having separated weakly acidic and weakly basic groups. For example, while shown as $H_2N—R—COOH$, in aqueous solution $^{+}H_3N—R—COO^{-}$ is the actual species where an internal proton transfer from the acidic carboxyl to the basic amino site is complete. The uncharged species has separate cationic and anionic sites but the positive and the negative ions are not free to migrate. Thus, it is a complex ion that is both positively and negatively charged. Alkyl betaines are also representative of zwitterions and are a special class of zwitterion where there is no hydrogen atom bonded to the cationic site. Some silicones are also zwitterions and it is this special category of silicone zwitterion to which the present invention relates.

The compounds of the present invention, more particularly the zwitterionic organofunctional siloxanes are prepared by the quaternization of precursor aminofunctional siloxanes with either cyclic propane sultone or cyclic butane sultone. Specifically, representative ones of the compounds of the present invention and silicone sulfobetaines as shown hereinafter in formulas (1) and (3) are prepared by a two-step process as set forth below:

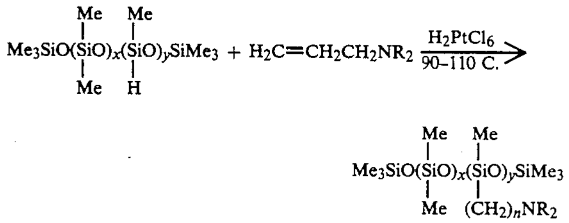

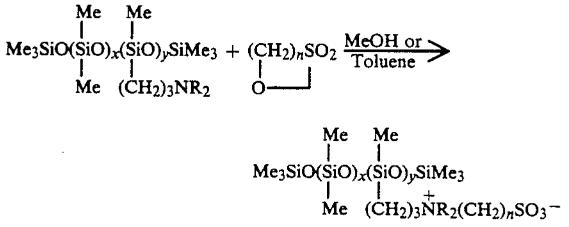

where

Me=methyl x=0–3 y=1, 2

R=methyl or ethyl, and n=3, 4.

Representative of the compounds of the present invention and silicone sulfobetaines as shown hereinafter in formula (2) are prepared by the same two-step process outlined above, except that the second step is modified as set forth below:

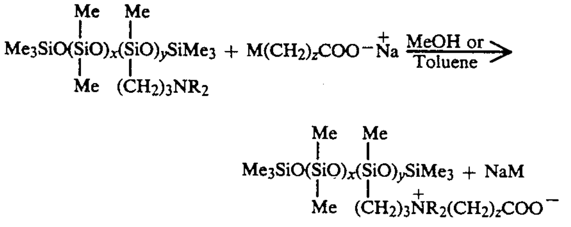

where
Me=methyl
x=0–3
y=1, 2
z=1–4
R=methyl or ethyl, and
M=$Cl^-$, $Br^-$, or $I^-$.

These compounds are colorless solids. They have a low water solubility and low critical micelle concentrations. The compounds are compatible with a wide range of surfactants and possess good thermal and oxidative stability, along with their high surface activity. Details of the synthesis of these materials are set forth in a copending U.S. patent application Ser. No. 07-004,734, of William N. Fenton et al, filed Jan. 20, 1987, and assigned to the same assignee as the present application. This copending application is considered to be incorporated herein by reference to show the preparation of the surfactant.

Generically, the compounds of the present invention can be represented by the following formula:

$$Me_3SiO[SiMe_2O]_x[SiMeR^1O]_ySiMe_3$$

and wherein:
Me=methyl
$R^1$=$—CH_2CH_2CH_2N^+(R^2)_2(CH_2)_zS^-O_3$, or $—CH_2CH_2CH_2N^+(R^2)_2(CH_2)_zC^-OO$
$R^2$=an alkyl group having from one to six carbon atoms or $(CH2)_mOH$
m=1–6
x=0–10
y=1–3, and
z=1–4.

Exemplary of compounds according to the present invention and covered by the foregoing generic structure are, for example $$R—N^+Me_2(CH_2)_3S^-O_3 \quad (1)$$

$$R—N^+Me_2(CH_2)C^-OO \quad (2)$$

$$R—N^+Me[(CH_2)_2OH](CH_2)_3S^-O_3 \quad (3)$$

where in each case R is $(Me_3SiO)_2Si(Me)—(CH_2)_3—$. Compounds (1)–(3) are short chain silicone surfactants, more particularly, silicone sulfobetaine zwitterionic organofunctional siloxane based surfactants. Each contain zwitterionic hydrophilic portions. For purposes of the present invention, the term short chain is a short siloxane chain where the degree of polymerization of the siloxane is less than about twenty and preferably less than about ten.

Specific examples of compounds within the scope of the invention include, but are not limited to, compounds of the Formula (1) and (2) types and of the following formulae:
(A) $R(CH_3)_2SiOSi(CH_3)_2R$,
(B) $(CH_3)_3SiOSi(CH_3)_2R$,
(C) $(CH_3)_3SiO—SiCH_3ROSi(CH_3)_3$,
(D) $(CH_3)_3SiO—[SiCH_3RO]_2—Si(CH_3)_3$,
(E) $(CH_3)_3Si—OSi(CH_3)_2O—SiCH_3RO—Si(CH_3)_3$,
(F) $(CH_3)_3Si—O[Si(CH_3)_2O]—[SiCH_3RO]_2Si(CH_3)_3$,
(G) $(CH_3)_3Si—O[Si(CH_3)_2O]_2—SiCH_3ROSi(CH_3)_3$, and
(H) $(CH_3)_3Si—O[Si(CH_3)_2O]_3—SiCH_3ROSi(CH_3)_3$ where R represents a monovalent zwitterionic radical chosen from radicals which include, but are not limited to $$—(CH_2)_3N^+(R'')_2(CH_2)_3SO_3^-, \text{ and}$$

$$—(CH_2)_3N^+(R'')_2(CH_2)_4SO_3^-$$

These compounds are synthesized by the aforementioned two step process comprising: (1) a hydrosilation reaction which involves reacting a Si-H functional precursor with N-allyl-N,N-dimethylamine, or other functionally similar chemicals, in the presence of platinum metal catalyst to form a tertiary amine functional siloxane compound; and, (2) a sulfopropylation or sulfobutylation reaction which involves reacting the product of step 1 with either cyclic 1,3-propanesultone or cyclic 1,4-butanesultone, or other similar chemicals.

The Si-H functional precursors can be prepared by a number of different methods known in the art. For instance, the precursor can be prepared by equilibrating a commercially available long chain Si-H functional polysiloxane, cyclic polydimethylsiloxanes, and hexamethyldisiloxane in the presence of an acid catalyst. The particular pecursor prepared will be a function of the proportion of starting materials. Particularly pure precursors can be prepared by the same method with careful distillation of the reaction product. Many of the polysiloxane precursors used to make compounds within the scope of the invention are commercially available.

The amine functional compound reacted with the Si-H functional precursor must have a tertiary amine functional radical in an allylic position. The tertiary amine functional compounds which are useful in the preparation of the present invention include N-allyl-N,N-dimethylamine and N-allyl-N,N-diethylamine. These tertiary amines are commercially available.

Typically the first step in the synthesis, the hydrosilation reaction, is run solventlessly at between 90° and 110° C. with between 1 and 100 ppm platinum metal catalyst. The reaction is usually complete between 90 minutes and 2 hours, and the reaction product can be purified by distillation. The resulting tertiary amine functional polysiloxane can be produced with greater than 80 weight percent purity.

The second step of the reaction is run at between about 50° C. and 150° C. in a mutual solvent of the cyclic alkylsultone and the tertiary amine functional polysiloxane for about 2 hours. The resulting reaction mixture can be purified by first removing the reaction solvent and then filter rinsing with toluene, alcohols, or ethers.

For comparative purposes, two other short chain silicone surfactant compounds are referred to hereinafter and are represented by the following formulas:

$$R—N^+Me_2(CH_2)_2OHI^- \quad (4)$$

$$R—(CH_2CH_2O)_7H \quad (5)$$

In compounds (4) and (5) R is also $(Me_3SiO)_2Si(Me)—(CH_2)_3—$. Compound (4) is a cationic surfactant and a cationic silicone quaternary salt having a hydrophilic portion. Compound (5) is a neutral nonionic silicone glycol and a neutrally charged polyethoxylated organosilicon surfactant having a hydrophilic portion. In tests conducted below, compounds (4) and (5) served the function of control materials.

In order to demonstrate the efficacy of the compounds of the present invention as foam boosters, four commercial low sudsing detergents were selected including ALL ®, BOLD 3 ®, YES ®, and SOLO ®. ALL ® is a trademark and a granular detergent manufactured by Lever Brothers Company, New York, N.Y. YES ® is a trademark and a liquid detergent manufactured by Morton Norwich Products, Greenville, S.C. BOLD 3 ® is a trademark and a granular detergent, SOLO ® is a trademark and a liquid detergent, each manufactured by The Procter & Gamble Company, Cincinnati, Ohio. Each detergent was first evaluated for its foaming capability by a shaking foam test. In the initial evaluation, no silicone zwitterionic surfactant was included. An eight ounce bottle was used for the test and the detergent was added at a one percent by weight level in one hundred milliliters of water. The bottle was capped and agitated for one minute. Foam heights were measured with a ruler immediately after agitation. Both YES ® and SOLO ® exhibited foams measuring two inches. The foam height of BOLD 3 ® was one-half inch, and the foam height of ALL ® about one inch. Since the detergents ALL ® and BOLD 3 ® produced the least amount of foam of the four detergents tested, ALL ® and BOLD 3 ® were selected for further evaluation to show the foam boosting capacity of the silicone zwitterionic surfactant compounds of the present invention. ALL ® and BOLD 3 ® are also known to contain cationic fabric softeners blended into the formulation which have traditionally interfered with high foam action causing a detergent to be classified as low sudsing. The silicone surfactants were added to the ALL ® detergent at room temperature, and to the BOLD 3 ® detergent at fifty degrees Centigrade. Each detergent was evaluated for its foaming capability again by a shaking foam test. However, in the second evaluation, silicone zwitterionic surfactants as well as silicone control surfactants were included. The standard Ross-Miles foam test was not conducted since the shaking foam test employed better assimilated the action and the agitation present in an actual washing machine. An eight ounce capped bottle was used for the test and the detergent was added at levels of one tenth of one percent by weight, and at a level of one percent by weight, in one hundred milliliters of water. In each case, the bottle was capped and agitated for one minute. Foam heights were measured visually with a ruler immediately after agitation. The results of these tests are tabulated in Tables I and II.

TABLE I

FOAMING OF 1.0 WT % BOLD 3 ® SOLUTIONS AT 50° C. WITH 1.0 WT % SILICONE SURFACTANT ADDED

| Silicone | Foam Height at Wt % Silicone (Inches) | | | | |
|---|---|---|---|---|---|
| Surfactant | 0 | 0.1(5 sec) | 0.1(5 min) | 1.0(5 sec) | 1.0(5 min) |
| 1 | 0.5 | 4.5 | 1.5 | 6 | 5 |
| 5 | 0.5 | 1 | 1 | 1 | 1 |
| 4 | 0.5 | 0 | 0 | 1 | 1 |
| 2 | 0.5 | 4 | 0.5 | 10 | 5 |

TABLE II

FOAMING HEIGHTS OF 1.0 WT % SOLUTIONS OF ALL ® DETERGENT WITH SILICONE SURFACTANT ADDED

| Silicone | Wt % Silicone | | |
|---|---|---|---|
| Surfactant | 0 | 0.1 | 1.0 |
| 2 | 0.5 | 2 | 2 |
| 1 | 0.5 | 3 | 3 |
| 3 | 0.5 | 0.5 | 2 |

TABLE II-continued

FOAMING HEIGHTS OF 1.0 WT % SOLUTIONS OF ALL ® DETERGENT WITH SILICONE SURFACTANT ADDED

| Silicone | Wt % Silicone | | |
|---|---|---|---|
| Surfactant | 0 | 0.1 | 1.0 |
| 4 | 0.5 | 0.5 | 0.5 |
| 5 | 0.5 | 1 | 1.5 |

In Table I, it will be seen that zwitterionic silicone surfactant compounds (1) and (2) were selected, along with silicone control compounds (4) and (5). The detergent used was BOLD 3 ®, and foam heights were determined at intervals of time in order to show foam stability as well as foam boosting capacity. It should be apparent that the zwitterionic silicone surfactant compounds (1) and (2) performed admirably at concentrations of both one and one tenth of one percent levels, and significantly boosted the foam height of the detergent solution. In Table II, the detergent was ALL ®, and the three zwitterionic silicone surfactant compounds (1)-(3) were used along with the silicone control compounds (4) and (5). The zwitterionic silicone compounds (1) and (2) performed admirably at both concentration levels employed, and compound (3) performed well at the one percent level. Of particular noteworthiness, is the fact that compounds (1) and (2) were as effective at the lower level of one tenth of one percent as they were at the one percent level. In any event, the compounds of the present invention provided a significant boost in the foam heights of the detergent solutions.

A series of tests were also conducted in order to demonstrate the effectiveness of the silicone zwitterionic surfactant compounds of the present invention in reducing the surface tension of detergent solutions. Dynamic surface tension data were obtained by a procedure which is a refinement of the standard maximum bubble pressure method, with the aid of a SensaDyne 5000 surface tensiometer manufactured by CHEM-DYNE Research Corporation, Madison, Wis. Dynamic surface tension is a measure of surface activity, and measures the surface energy of the test fluid and the speed of surfactant migration. As noted above, dynamic surface tension is measured utilizing the maximum bubble pressure method with a SensaDyne 5000 surface tensiometer. This instrument measures surface tension by determining the force required to blow bubbles from an orifice and into the test solution. Thus, a low surface energy fluid requires less energy to force a bubble out of the orifice than does a fluid of high surface energy. The speed of surfactant migration, however, is determined by changing the speed of the evolution of the bubbles. With a slow bubble rate, the surfactants have more time to reach the bubble-liquid interface and to orient in order to reduce the surface energy at the interface. With a fast bubble rate, the surfactants have less time to reach the newly formed bubble before the bubble is forced from the orifice. Hence, the surface energy for the fast rate is higher than the surface energy for the slow rate. In the instrument itself, a process gas such as dry nitrogen or clean dry air, is bubbled through two tubes of different diameter that are immersed in the fluid being tested. At each orifice, a bubble is formed in a controlled manner until the bubble reaches a maximum value where it breaks off rising to the surface of the test fluid. Since the two orifices differ in diameter, the two bubbles differ in maximum size and in the maximum pressure required to expand each bubble. This differential pressure is sensed by a transducer and the resulting output signal is used to measure dynamic surface tension directly. The foregoing technique was used in order to determine the dynamic surface tension of various systems, and the results are tabulated in Tables III to VII.

TABLE III

DYNAMIC SURFACE TENSION MEASUREMENTS FOR 1% AQUEOUS COMMERCIAL DETERGENT SOLUTIONS (DYNE/CM)

| | Bubble Rate (Hz.) | | | | |
|---|---|---|---|---|---|
| Detergent | 1 | 2 | 3 | 4 | 5 |
| SOLO ® | 38.8 | 41.3 | 43.9 | 45.8 | 48.1 |
| YES ® | 38.9 | 42.7 | 45.5 | 46.8 | 46.9 |
| BOLD 3 ® | 47.8 | 53.8 | 59.9 | 62.4 | 65.4 |
| ALL ® | 39.7 | 43.7 | 46.5 | 48.5 | 50.4 |

TABLE IV

DYNAMIC SURFACE TENSION MEASUREMENTS FOR 1% ALL ® DETERGENT PLUS 1% SILICONE SURFACTANT SOLUTIONS (DYNE/CM)

| Silicone | Bubble Rate (Hz.) | | | | |
|---|---|---|---|---|---|
| Surfactant | 1 | 2 | 3 | 4 | 5 |
| 2 | 27.9 | 29.3 | 30.9 | 32.2 | 34.0 |
| 1 | 27.1 | 28.3 | 29.5 | 30.5 | 32.1 |
| 3 | 25.3 | 27.3 | 29.3 | 31.3 | 33.8 |

TABLE V

DYNAMIC SURFACE TENSION MEASUREMENTS FOR 1% BOLD 3 ® DETERGENT PLUS 1% COMPOUND (2) AT VARIOUS TEMPERATURES (DYNE/CM)

| Average | Bubble Rate (Hz.) | | | | |
|---|---|---|---|---|---|
| Temperature | 1 | 2 | 3 | 4 | 5 |
| 24 | 24.4 | 24.9 | 25.3 | 25.4 | 26.1 |
| 38 | 24.1 | 24.2 | 24.6 | 24.9 | 25.4 |
| 54 | 36.6 | 38.4 | 40.8 | 42.3 | 28.1 |
| 75 | 25.9 | 27.9 | 32.1 | 35.1 | 37.6 |

TABLE VI

DYNAMIC SURFACE TENSION MEASUREMENTS FOR 1% BOLD 3 ® PLUS 1% COMPOUND (3) AT VARIOUS TEMPERATURES

| Average | Bubble Rate (Hz.) | | | | |
|---|---|---|---|---|---|
| Temperature | 1 | 2 | 3 | 4 | 5 |
| 25 | 24.3 | 24.6 | 25.3 | 25.8 | 26.3 |
| 45 | 22.9 | 23.6 | 24.5 | 25.2 | 26.6 |
| 64 | 24.4 | 26.2 | 28.7 | 30.8 | 33.6 |
| 80 | 27.3 | 30.2 | 32.9 | 35.2 | 38.8 |

TABLE VII

DYNAMIC SURFACE TENSION MEASUREMENTS FOR 1% BOLD 3 ® PLUS 1% COMPOUND (1) AT VARIOUS TEMPERATURES

| Average | Bubble Rate (Hz.) | | | | |
|---|---|---|---|---|---|
| Temperature | 1 | 2 | 3 | 4 | 5 |
| 26 | 22.3 | 22.5 | 22.8 | 23.1 | 23.4 |
| 43 | 21.7 | 22.3 | 22.9 | 23.5 | 24.4 |
| 61 | 22.7 | 24.8 | 27.2 | 29.7 | 32.9 |
| 78 | 27.6 | 35.5 | 33.5 | 30.6 | 38.6 |

In Table III, the dynamic surface tension of the four detergents SOLO ®, YES ®, BOLD 3 ®, and ALL ®, were determined at various bubble rates, and as one percent aqueous solutions without the addition of a silicone surfactant. Tables IV–VII show the dramatic reduction in dynamic surface tension achieved upon inclusion of certain of the silicone surfactants of the present invention. In Table IV, for example, the dynamic surface tension of a one percent solution of the detergent ALL ® was determined and including one percent of one of the silicone zwitterionic surfactant compounds (1)–(3), again at various bubble rates. In Tables V–VII, the detergent employed as BOLD 3 ®, and separate ones of the silicone zwitterionic surfactant compounds (1)–(3) were used at levels of one percent, and at various bubble rates. The data in Tables V–VII was also determined at varying temperatures with each solution of the BOLD 3 ® detergent which included a particular one of the silicone zwitterionic surfactant compounds (1)–(3). The data in Tables III–VII indicates that at least for compounds (1)–(3), foam boosting silicone surfactant materials also substantially lower the dynamic surface tension of low sudsing detergent solutions, and therefore provide the added benefit of improved detergency based on such surface tension reduction characteristics.

It will be apparent from the foregoing that many other variations and modifications may be made in the structures, compounds, compositions, and methods described herein without departing substantially from the essential concepts of the present invention. Accordingly, it should be clearly understood that the forms of the invention described herein are exemplary only and are not intended as limitations on the scope of the present invention.

That which is claimed is:

1. A method of boosting foam in a low sudsing detergent system which contains cationic or nonionic fabric softening surfactants in a textile wash liquor comprising adding to the wash liquor in addition to the detergent an organosulfobetaine zwitterionic siloxane based compound having the general formula selected from the group consisting of:

$$Me_3SiO(SiMeR^1O)_ySiMe_3$$

and $$Me_3SiO(SiMe_2O)_x(SiMeR^1O)_ySiMe_3$$

wherein:

Me=methyl;

$R^1$ = $-CH_2CH_2CH_2N^+(R^2)_2(CH_2)_zSO_3^-$, or $-CH_2CH_2CH_2N^+(R^2)_2(CH_2)_zCOO^-$;

$R^2$ = an alkyl group having from one to six carbon atoms or $(CH_2)_mOH$;

m=1–6;

x=1–10;

y=1–3; and z=1–4, and mixing the detergent and the siloxane compound in the wash liquor along with the textiles.

2. The method of claim 1 wherein the siloxane compound is present in the wash liquor in an amount of from about one tenth of one percent to about one percent by weight based on the weight of wash liquor.

3. The method of claim 2 wherein the degree of polymerization of the siloxane is less than about twenty.

4. A detergent comprising a low sudsing detergent formulation which includes cationic or nonionic fabric softening surfactants for a textile wash liquor and an organosulfobetaine zwitterionic siloxane based compound, the detergent and the siloxane compound being mixed together for use in the wash liquor along with the textiles, the siloxane being a compound having the general formula selected from the group consisting of:

$Me_3SiO(SiMeR^1O)_ySiMe_3$ and $Me_3SiO(SiMe_2O)_x(SiMeR^1O)_ySiMe_3$ wherein:
Me=methyl;
$R^1$=$-CH_2CH_2CH_2N^+(R^2)_2(CH_2)_zSO_3^-$, or $-CH_2CH_2CH_2N^+(R^2)_2(CH_2)_zCOO^-$;
$R^2$=alkyl group having from one to six carbon atoms or $(CH_2)_mOH$;
m=1–6;
x=1–10;
y=1–3; and
z=1–4.

5. The detergent of claim 4 wherein the siloxane compound is present in an amount of from about one tenth of one percent to about one percent by weight based on the weight of the wash liquor.

6. The detergent of claim 5 wherein the degree of polymerization of the siloxane is less than about twenty.

7. A method of reducing the surface tension of a low sudsing detergent system which contains cationic or nonionic fabric softening surfactants in a textile wash liquor comprising adding to the wash liquor in addition to the detergent, an organosulfobetaine zwitterionic siloxane based compound having the general formula selected from the group consisting of:

$Me_3SiO(SiMeR^1O)_ySiMe_3$ and $Me_3SiO(SiMe_2O)_x(SiMeR^1O)_ySiMe_3$ wherein:
Me=methyl;
$R^1$=$-CH_2CH_2CH_2N^+(R^2)_2(CH_2)_zSO_3^-$, or $-CH_2CH_2CH_2N^+(R^2)_2(CH_2)_zCOO^-$;
$R^2$=an alkyl group having from one to six carbon atoms or $(CH_2)_mOH$;
m=1–6;
x=1–10;
y=1–3; and
z=1–4, and mixing the detergent and the siloxane compound in the wash liquor along with the textiles.

8. The method of claim 7 wherein the siloxane compound is present in the wash liquor in an amount of from about one tenth of one percent to about one percent by weight based on the weight of wash liquor.

9. The method of claim 8 wherein the degree of polymerization of the siloxane is less than about twenty.

10. A method of boosting foam and simultaneously reducing the surface tension in a low sudsing detergent system which contains cationic or nonionic fabric softening surfactants in a textile wash liquor comprising adding to the wash liquor in addition to the detergent an organosulfobetaine zwitterionic siloxane based compound having the general formula selected from the group consisting of:

$Me_3SiO(SiMeR^1O)_ySiMe_3$ and $Me_3SiO(SiMe_2O)_x(SiMeR^1O)_ySiMe_3$ wherein:
Me=methyl;
$R^1$=$-CH_2CH_2CH_2N^+(R^2)_2(CH_2)_zSO_3^-$, or $-CH_2CH_2CH_2N^+(R^2)_2(CH_2)_zCOO^-$;
$R^2$=an alkyl group having from one to six carbon atoms or $(CH_2)_mOH$;
m=1–6;
x=1–10;
y=1–3; and
z=1–4, and mixing the detergent and the siloxane compound in the wash liquor along with the textiles.

11. The method of claim 10 wherein the siloxane compound is present in the wash liquor in an amount of from about one tenth of one percent to about one percent by weight based on the weight of wash liquor.

12. The method of claim 11 wherein the degree of polymerization of the siloxane is less than about twenty.

* * * * *